United States Patent [19]

Boehringer

[11] 4,182,175

[45] Jan. 8, 1980

[54] SPIROMETER

[76] Inventor: John R. Boehringer, 427 Parkview Dr., Wynnewood, Pa. 19096

[21] Appl. No.: 864,523

[22] Filed: Dec. 27, 1977

[51] Int. Cl.² ............................ G01F 1/07; G01F 1/08
[52] U.S. Cl. .................................................... 73/229
[58] Field of Search ............. 73/229, 230, 272, 273; 128/2.08; 235/1 D

[56] References Cited

U.S. PATENT DOCUMENTS

| | | | |
|---|---|---|---|
| 314,480 | 3/1885 | Rosenkranz et al. | 73/229 |
| 864,579 | 8/1907 | Volz | 73/230 |
| 1,702,762 | 2/1929 | Brubaker | 73/272 |
| 2,960,074 | 11/1960 | Zavada | 73/258 X |
| 3,382,716 | 5/1968 | Struck | 73/258 |
| 3,435,679 | 4/1969 | Davis | 73/258 |
| 3,442,126 | 5/1969 | Southall | 73/258 X |
| 3,572,118 | 3/1971 | Hilzendegen | 73/229 |
| 3,903,742 | 9/1975 | Colton | 128/2.08 |
| 3,922,525 | 11/1975 | Kozak | 128/2.08 |
| 3,949,606 | 4/1976 | Blancett | 73/258 X |

*Primary Examiner*—Herbert Goldstein
*Attorney, Agent, or Firm*—Paul & Paul

[57] ABSTRACT

A turbine is mounted in an annular cavity, and is provided peripherally with exhaled air, which is exhausted axially therefrom. A fixed stator has axially extending, chordally penetrating slots therein, and a calibrating ring adjustable for partial occlusion of the slots. The rotor within the stator rides on jeweled bearings, and comprises fiberglass sheets bonded to the shaft and extending outwardly therefrom. Turns of the rotor are coupled to a stopwatch-type accumulator mechanism by substantially colinear, bent interfering shafts which define a low friction low inertia universal joint. The stopwatch accumulator is readily detachable for sterilization of the turbine/housing portion.

21 Claims, 8 Drawing Figures

SPIROMETER

BACKGROUND OF THE INVENTION

This invention relates to spirometers, and more particularly, to the class of spirometers which employs turbine operation to develop a representation of air volume exiting the lungs of a patient.

Spirometers involve interesting design problems and limitations, in that a high degree of clinical safety and operational accuracy is required, while structural simplicity, cost efficiency, and ease of sterilizability are also highly desirable. Yet these general goals are often conflicting, in that accuracy of measurement often leads to complications of design which are detrimental to reliability. Heavy construction, while promoting reliability leads to serious problems of high friction and lack of response to low flows and/or to high inertia which promotes "coasting" after high flows. In addition, use of readily available materials in conventional design usually involves structural aspects not readily amenable to sterilization techniques and general convenience of clinical use. The present invention is accordingly directed to provision of a spirometer which is accurate, relatively inexpensive, compact and convenient for clinical use, structurally amenable to sterilization, and reliable and durable under clinical conditions.

SUMMARY OF THE INVENTION

The present invention relates to a spirometer which utilizes a turbine system of the type commonly referred to as a Francis turbine in a conduit to which fluid flow enters peripherally and is exhausted axially. A fixed stator is provided with openings to direct air from an inlet port and cavity to a rotor turning within the stator, from which axial exhaust occurs. The rotor in turn is coupled to a stopwatch-type accumulator/counter, which registers a representation of air volume passing through and operating the turbine.

In a preferred embodiment, the stator is cylindrical and fixed within an annular cavity, to which patient air is coupled. Axial, chordally penetrating slots channel the air through the stator to create a vortex therein, and a concentric ring around the stator provides calibration by partial occlusion of the slots. The rotor within the stator is turned on jeweled bearings by the air vortex. The rotor constitutes integral, oppositely facing vanes comprising outwardly tapered resin reinforced fiberglass sheets bonded about the shaft. A stopwatch-type mechanism is detachably mounted to the turbine housing forming a chamber therebetween, and having its drive shaft substantially colinear with the turbine shaft. Both such shafts are bent to interface one another for a universal joint.

It is a feature of the present invention that the slotted turbine stator in combination with a ring for adjustable occlusion of the slots provides for easy and highly accurate calibration of the meter, after assembly. This is in contrast to most prior art devices which utilize bypass openings of varying bypass ratio, electronic circuits calibrated at different and adjustable rates, or expensive extreme precision to achieve similar flow response.

It is another feature of the present invention that the tapered, fiberglass vane rotor on jeweled bearings provides highly responsive action with minimal inertia difficulties. That is, existing turbine meters typically have rotors which at conventional speeds often fail in clinical useage, or are so heavy that inertia becomes an operational disability. The rotor featured in accordance with the present invention is strong enough to avoid failure, yet light enough to avoid inertia disability.

In accordance with yet another feature of the present invention, the detachability of the stopwatch-type accumulator/counter mechanism from the main housing substantially enhances sterilizability. Further, during repeated useages and sterilizations, the same counter mechanism may be employed with different (and separately calibrated to a fixed reference) turbine/housing portions, thus reducing the cost of buying a complete turbine and counter for each patient who must be isolated.

It is yet another feature of the present invention that the jeweled bearings for the rotor shaft allow for such a precision fitting of shaft to bearing that the airway is sealed from the accumulator/counter mechanism under ambient pressure conditions merely by the surface tension of fluid (water or condensate) in the area of the bearing, thus eliminating the danger of the mercury seal used in some other meters of this type.

In accordance with the further feature of the present invention, the colinear bent interfacing shafts between rotor and accumulator/counter provide an essentially constant velocity, extremely low friction joint which readily disengages for the sterilization process. The vented antechamber between turbine and counter which is sealed from turbine and counter by the above-mentioned jewel seals allows humidity and moisture to vent to atmosphere thus safeguarding the counter.

Still another feature of the present invention involves an accumulator itself and the detachability of the accumulator/counter from the rotor and housing by a spring arrangement with a pair of spaced bayonet pins. Such facility enables convenient reading and use at virtually any orientation of the rotor and housing, merely by altering the orientation of the accumulator/counter.

These and other features of the present invention will be apparent upon consideration of the following specification in conjunction with the attached drawings.

BRIEF DESCRIPTIONS OF THE DRAWING FIGURES

DETAILED DESCRIPTION OF THE PREFERRED EMBODIMENTS

Figure 1A:
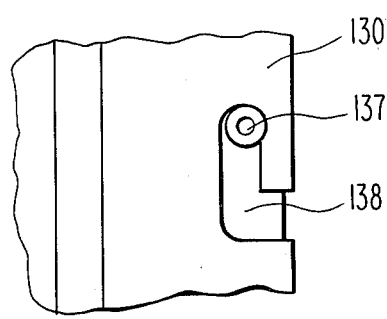
FIG. 1a shows a detail section of a preferred technique for mounting an accumulator/counter to a turbine housing in accordance with the principles of the present invention.
Figure 1:
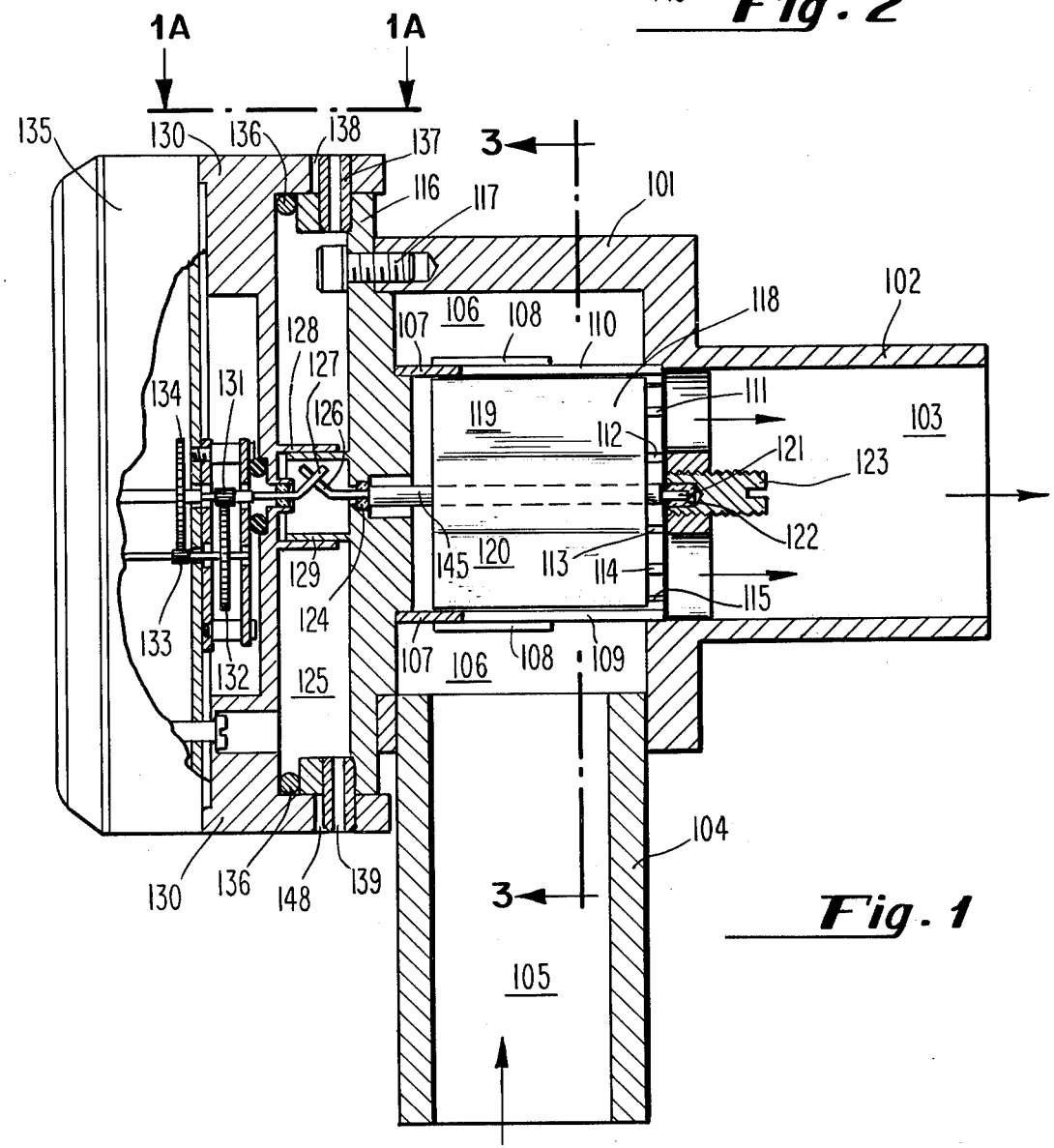
FIG. 1 shows a cutaway side view of a preferred embodiment of the present invention.
Figure 3:
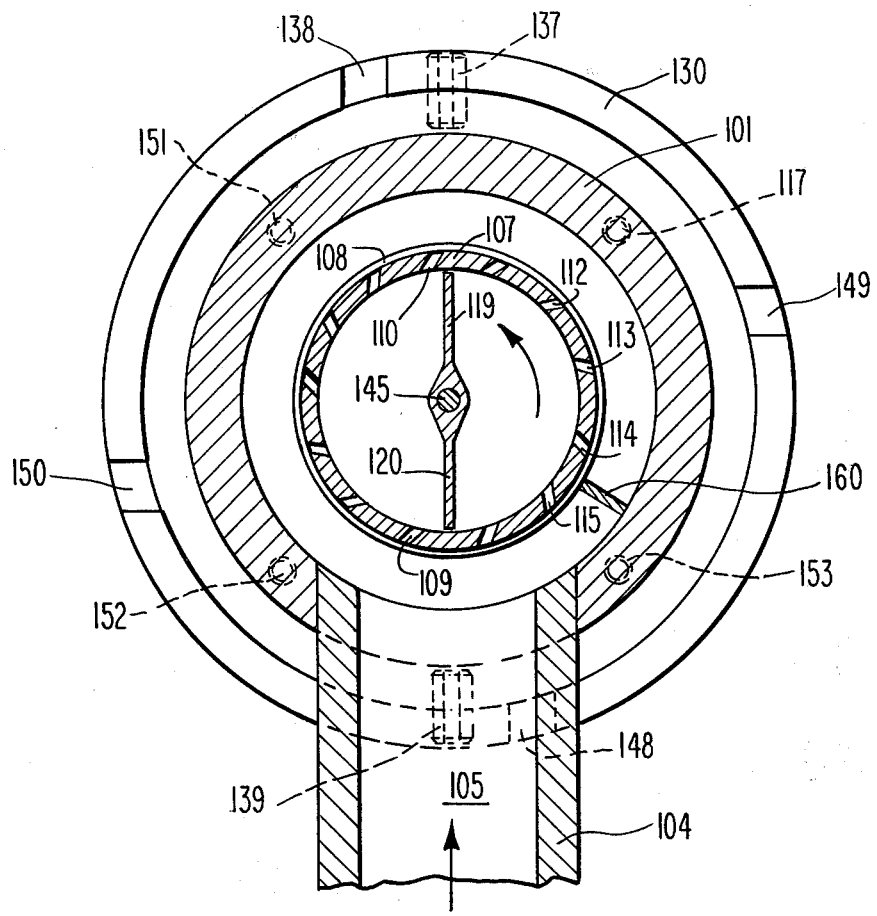
FIG. 3 shows a transverse cutaway of the embodiment of FIG. 1.

Referring first to FIGS. 1 and 3, there are shown side and back cutaway views of a preferred embodiment of the present invention. Patient exhaled air is coupled to an input port 105 defined by turbular portion 104, and into an annular cavity 106 formed by a housing 101 and 116, and the stator portion 107 of a turbine. In particular, stator 107 is held in place between outer housing 101 and housing plate 116, and has a close fitting but coaxially movable ring 108 thereabout. Stator 107 has axial, chordally penetrating slots milled therein, such as 109 through 115 as shown. The close fitting concentric ring 108 is knife-edged and thereby provides a highly accurate calibration by selective occlusion of the slots such as 109 through 115, as the ring 108 is moved axially along the stator 107. Hence, after assembly of the entire unit, the meter reading at a standard flow of air through the slots such as 109 through 115 of the stator 107, and onto the rotor 118, may be adjusted to a calibrated standard by axial movement of the calibration ring 108, and concomitant variation of the occlusion thereof of the slots in the stator 107.

Figure 4:
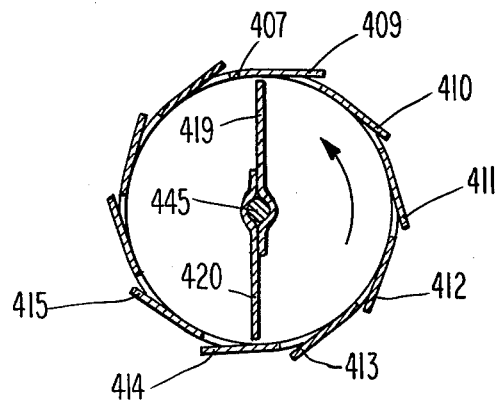
FIG. 4 shows a profile view of an alternative configuration for a turbine in accordance with the principles of the present invention.

Air from the input port 105 through the cavity 106 and into slots 109 through 115 in stator 107 bears against vanes 119 and 120 of rotor 118 in a vortex fashion that causes the rotor 118 to turn as shown in FIG. 3. It will be appreciated that in addition to the occlusion of the slots such as 109 through 115 by ring 108, the length and width of the slots will correspondingly affect the operation of the rotor 118. As shown in FIGS. 1 and 3, rotor 118 is formed of integral, oppositely directed vanes 119 and 120 extending outwardly from a central shaft 145 located on the axis of stator 107. In one alternative construction, as shown in FIG. 3, the rotor 117 is formed of two layers of fiberglass, one on each side of shaft 145, both extending the entire width of the rotor including vanes 119 and 120. In an alternative construction, as shown in FIG. 4, separate layers 419 and 420 form respective opposing vanes, which are bound to each other in the region of the shaft 445. In both versions, a polymer-resin is utilized to bind the fiberglass layers to each other and to the shaft 145. Hence, as noted in FIG. 3, a radial outwardly tapering vane is formed such as 119 and 120, thicker near the axis (e.g., 0.025 inches) and very thin (e.g., 0.003 inches) at the extremity. Nevertheless, the integral fiberglass-resin construction results in substantially enhanced strength. Hence, in both constructions there is produced a very light, high speed rotor capable of easy starting and stopping, and still durable at the 30,000 rpm rates clinically experienced when checking vital capacity. The mechanism of this invention is capable of accelerating to 30,000 rpm in less than one second, running for one second, and deceleration to zero in less than one second, creating very large stress problems. By the device of this invention, rotor inertia is substantially reduced as a factor in performance evaluation.

Shaft 145 is mounted on jeweled bearings 122 and 124 (at points such as 121 and 126 where the shaft 145 is thinner for efficiency). More particularly, at the outlet port end, the shaft 121 is carried by a ring jewel and cap stone 122, and a screw adjustment 123 is provided to control, as desired, the end play of the rotor 118. On the side of the rotor 118 opposite the outlet port 103, the shaft 126 penetrates a jeweled bearing 124, in a precision, close fitting fashion. Such a tight fit, which is readily made possible through the use of jeweled bearings such as of sapphire, enables a sealing of the bearing joint merely by fluid surface tension (i.e., water and/or ambient condensate). Hence, the air passage between inlet port 105 and exhaust port 103 is isolated from the accumulator/counter mechanisms described hereinafter by a jewel bearing-seal in the turbine, a jewel bearing seal in the accumulator means and a vented chamber to atmosphere between them vented by the hollow pins 137, 139 and clearance around the turbine-accumulator housing. The face plate 116 is affixed to the principal housing 101 by screw connections 117, 151, 152, and 153. The plate 116 also involves an annular flange on its periphery, carrying bayonet pins 137 and 139 extending radially therefrom. A cylindrical proturberance 129 surrounds shaft 126, and extends outwardly therebeyond.

An optional feature shown in FIG. 3 is the inclusion of a barrier 160 which extends longitudinally in the cavity 106 between end plate 116 and the exhaust area. The barrier 115 forces the flow of air from input port 105 into chamber 106 in a direction opposite to the penetration direction of the slots such as 108 through 114 in the stator 107. A rather constant pressure head is thereby set up in the cavity 106, avoiding deleterious flow interaction between the rotor 119 and the rotational inertia of the air in cavity 106.

In partial summary, the portions of the apparatus thusfar described form a turbine mechanism for use in spirometry which is integral, clinically effective, and readily detachable for purposes of sterilization. Further, calibration is convenient, and the rotor assembly is strong and responsive in clinical conditions. The air passageway is effectively isolated from the mechanical accumulator/counter means, described as follows.

As will be evident from the drawings, the two hollow bayonet pins 137 and 139, which extend radially from the plate 116 of the main housing cooperate with two opposed ones of the slots 138, 148, 149, and 150 in an oppositely facing annular flange from body 130 of a mechanical counter/accumulator mechanism 135. As may be seen more clearly from detail FIG. 1a, the slots such as 138 involve an angular configuration whereby the counter mechanism 135 may be fitted over the pins such as 137, then twisted in clockwise fashion (viewed from the front of 135) until the pins such as 137 rest securely in the cul-de-sac of the slots such as 138. A spring 136 loads the combination, so that the counter-/accumulator 135 is held securely in place during use. It will be appreciated not only that such removability of the counter/accumulator mechanism 135 facilitates sterilizability of the remainder of the unit, but also that the semicircle mounting of pins 137 and 139, enables the accumulator/counter 135 to be mounted, as desired, at any of a pair of orientations with respect to the housing, depending on the desired clinical location and orientation. Further, the accumulator portion 135 may be used with a plurality of different turbine-housing portions, so long as all are calibrated to the same reference, thus reducing the user's investment dramatically.

Figure 2:
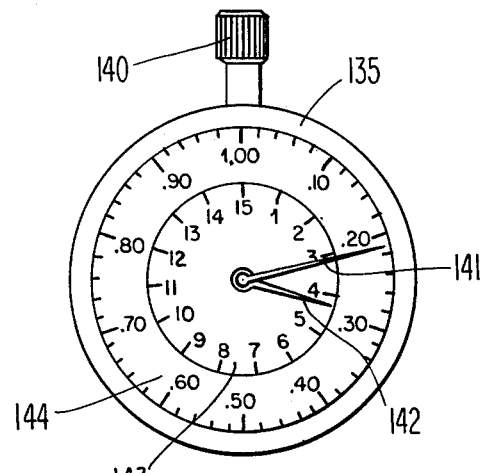
FIG. 2 shows an illustrative front view of a stopwatch-type accumulator/counter in accordance with the principles of the present invention.

In an illustrative embodiment, the accumulator/counter 135 consists of a mechanism of a Swiss stopwatch commonly referred to as a two function watch (stop and start with one button, and reset with another). Alternatively, single button watches which accomplish all three functions may be utilized as is known in the art. The latter variety is shown in FIG. 2. In accordance with the present invention, however, the mechanism is driven not by a watch spring, but rather by revolutions of the rotor 118. Hence, a shaft 127 protrudes on a jeweled bearing from rear plate 130, where it interferes with and is turned by the oppositely extending section 126 of the shaft 145 of rotor 118. Shaft 127 picks up the gear train of the stopwatch mechanism downstream of the escapement thereof, and via gears such as 131, 132, 133, and 134 drives the stopwatch mechanism. As shown in FIG. 2, the front view of accumulator portion 135 appears as a three function single button watch, operated by button 140. Respective incremental and fractional sweep hands 142 and 141 display vital capacity of the patient on corresponding incremental and fractional scales 143 and 144, advantageously calibrated in liters.

Colinear shafts 126 and 127 are bent as shown at opposite equal angles (e.g., 45 degrees), and their crossing interference transmits motion from rotor 118 to the gears such as 131 and 132 of the accumulator/counter 135. The crossed shaft system establishes a constant velocity, low friction, low inertia joint which readily disengages upon removal of the accumulator portion 135 from the housing/turbine portion. Because of the mutually angled configuration, the shafts cannot be injured during re-engagement. Hence, a universal joint is thereby formed which effectively transmits motion, yet which is of low friction, of low inertia, and simple to disengage and re-engage without pre-indexing as would be necessary with a keyway or a spline. Magnetic coupling is an alternate method, but is generally less satisfactory due to poor inertia characteristics.

As previously set forth, shaft protrusion 126 from the rotor 118 is protected by a cylindrical protuberance 129 extending outwardly from plate 116. As shown, an oppositely directed matable cylindrical protuberance 128 extends outwardly from back plate 130 of accumulator mechanism 135 similarly to protect shaft 127 upon disengagement.

FIG. 4 shows an alternative construction for a turbine in accordance with the principles of the present invention. In FIG. 4, the slotted stator 107 is replaced by an alternative configuration 407 wherein the slots such as 109 through 115 are replaced by louvered fins such as 409 through 415. A preferred mode of forming the fins such as 409 through 415 is to make substantially parallel cuts in a metallic cylinder, each of which cuts forms three sides of a rectangle. The portions so cut may then be bent outwardly as shown in FIG. 4 to form the louvered fins.

Figure 5A:
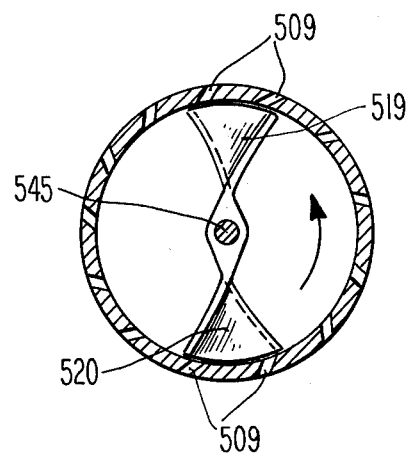
FIGS. 5A and 5B show yet another rotor configuration.
Figure 5B:
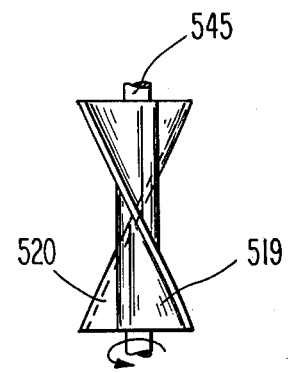

An alternative rotor configuration is set forth in FIGS. 5A and 5B. Basically, those figures show a rotor having vanes 519 and 520 mounted on a shaft 545, in similar fashion to either of the rotors of FIGS. 3 and 4. In the embodiment of FIGS. 5A and 5B, however, the vanes 520 and 519, rather than being planar, are graded longitudinally in propeller fashion, such that a particular vane 519 or 520 is deflected from end to end to form a sector having an outer radius (i.e., as seen in the FIG. 5A view) extending over at least two slots such as 509. Such spanning capability by a given vane such as 519 or 520 of multiple shots such as 509 tends to provide a continuity of force against the rotor, such that a given rotor vane such as 519 is always being subjected to partial flow from at least two slots. "Puffing" effects which may occur in accordance with the embodiment of FIG. 3 or 4 are thereby prevented.

In an alternative embodiment which achieves the same effect, the rotor vanes are planar as shown in FIGS. 3 and 4, but the slots in the stator are helically formed, whereby the planar rotor still spans portions of adjacent slots simultaneously.

Figure 6:
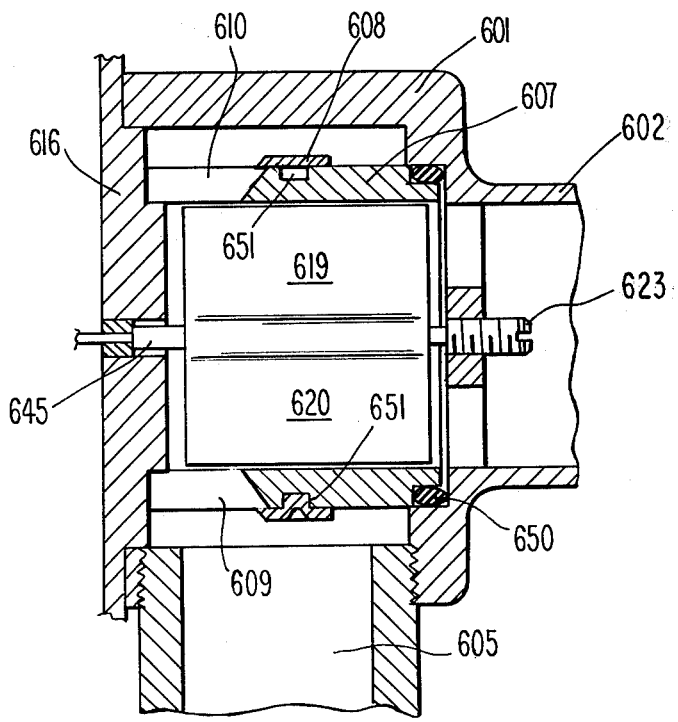
FIG. 6 shows a cross section of still another embodiment.

FIG. 6 shows an alternative construction for the rotor-stator structure. The embodiment of FIG. 6 is similar in function to that of FIG. 1, and in fact, involves an identical accumulator mechanism and the like. Hence, housing 601 and front plate 616 are identical to the similar members 101 and 116 of FIG. 1. Likewise, adjustment screw 623 is identical in form and function to the screw adjustment mechanism 123 of the FIG. 1 embodiment, and the jeweled bearings and the like are similarly identical.

In FIG. 6, rotor vanes 619 and 620 are mounted on a shaft 645, and are formed in accordance with one of the embodiments set forth in FIG. 3, 4, or 5A or 5B. A stator 607 is fixedly mounted within the housing formed by element 601 and 616, additionally optionally including a rubber O-ring 650 for purposes of tightness of seal. Slots such as 609 and 610 are formed in the stator 607, in a direction opposite to those shown in the FIG. 1 embodiment. In FIG. 6, the milling process produces a knife-edged effect at the point of formation of the slot 610. A calibration ring 608 is formed with a knife-edge, for predetermined partial occlusion of the slots such as 610.

As in the case of ring 108 in the embodiment of FIG. 1, the calibration ring 608 in FIG. 6 is utilized for adjustment of the meter to particular flows prior to use. In the embodiment of FIG. 6, however, the stator 607 is provided with a circumferential channel 651 in the region which will be overlapped by the calibration ring 608. Upon assembly the calibration ring 608 is loosely movable along the stator 607. When the entire apparatus is assembled, calibration is commenced by providing a known air flow into the inlet 605, and manipulating the calibration ring 608 along stator 607 until the turning of rotors 619 and 620 properly registers flow on the accumulator mechanism. At that point, the proper position has been established for the calibration ring 608, and a punch or the like is placed through the inlet port 605 and against the calibration ring 608. The punch is then used to dimple the calibration ring 608 to protrude into the slot 651, as shown in FIG. 6, thereby fixing the position of the ring 608 in calibrated condition with respect to the stator 607. Of course, the calibration ring may take various forms, usuable with different types of openings. The rings may be movable axially or rotationally, or a combination of both, and either slideably as a sleeve, or threadably slideable along the stator. The openings may also be of various types, such as slots, holes, axially, circumferentially or helically extensive or the like.

The foregoing specification in conjunction with the attached drawings has set forth illustrative and preferred embodiments of the present invention. It will be appreciated that numerous alternative embodiments will occur to those of ordinary skill in the art without departure from the spirit or the scope of the principles of the present invention.

I claim:

1. A spirometer comprising:
   (a) a first unit of use in obtaining pulmonary measurements of a user and requiring periodic sterilization including a conduit having an inlet port for receiving patient's exhaled air, and an outlet port, and defining a flow path therebetween, flow responsive turbine means disposed in the flow path for reacting to flow volume of exhaled air through the conduit;
   (b) a second unit not requiring periodic sterilization and including indicator means out of flow communication with said flow path, connected to and readily disconnectable from said flow responsive turbine means for providing a representation of air volume passing through said condiut, for separation of said unit from said first unit for sterilization of first unit, including means isolating said indicator means from said air flow path;

(c) mutually cooperative connecting means matably provided on each said unit for ready release and detachment of said indicator means from said conduit for separation of said indicator therefrom; and (d) mechanical motion transmission means in operative direct mechanical interconnecting relation between said indicator means and said turbine means, from a location within said flow path to a location out of communication with said flow path.

2. The spirometer of claim 1, including means isolating said indicator means from said air flow path.

3. The spirometer of claim 1, wherein said turbine means comprises a fixed stator and a rotor therein, rotational relative to a central axis of said stator; said fixed stator having opening means therein that comprise part of said flow path.

4. A spirometer as described in claim 1, wherein said connecting means comprise means mounting said conduit and said indicator means together in positional stability by a plurality of joining means indexed relative to one another.

5. A spirometer as described in claim 1, wherein indicator means comprises an accumulator means.

6. A spirometer as described in claim 1, wherein said indicator means comprises an accumulator means for cumulatively indicating revolutions of said rotor.

7. A spirometer comprising:

(a) a first unit for use in obtaining pulmonary measurements of a user and requiring periodic sterilization including a conduit having an inlet port for receiving patient's exhaled air, and an outlet port, and defining a flow path therebetween, flow responsive means disposed in the flow path for reacting to flow volume of exhaled air through the conduit, wherein said flow responsive means compises a turbine, said turbine comprising a fixed stator and a rotor therein, rotational relative to a central axis of said stator, said fixed stator having opening means therein that comprise part of said flow path wherein said turbine further includes calibration means for varying said opening means to vary said flow through said stator and onto said rotor;

(b) a second unit not requiring periodic sterilization and including indicator means out of flow communication with said flow path, and operationally connected to and readily disconnectable from said flow responsive means for providing a representation of air volume passing through said conduit, for separation of said unit from said first unit for sterilization of first unit; and (c) mutually cooperative connecting means matably provided on each said unit for ready release of said indicator means from said conduit for separation of said indicator therefrom.

8. A spirometer as defined in claim 7, wherein said stator is cylindrically configured, wherein said opening means comprises generally axially extending slots in the periphery of said stator and with a movable calibration ring positionable on the surface of said stator axilly to partially overlay said slots.

9. A spirometer as described in claim 7, wherein said calibration means comprises a sleeve conventionally disposed about said stator and at least initially adapted for repositioning thereabout for occluding said opening means.

10. A spirometer as described in claim 9, including means securing said sleeve in a given position on said stator after calibration is effected by desired repositioning of said sleeve.

11. In a spirometer for measuring air volume having a conduit having an inlet port and an outlet port and defining a flow path therebetween, and flow responsive means disposed in the flow path for reacting to a flow volume of air through the conduit, the improvement which comprises:

a turbine constituting said flow responsive means, said turbine comprising a fixed stator and a rotor therein, rotational relative to a central axis of said stator, said fixed stator having opening means therein that comprise part of said flow path wherein said stator is cylindrically configured, and wherein said opening means are defined by louvered fins cut from said stator and formed chordally with respect to said stator.

12. A spirometer comprising:

(a) a first unit for use in obtaining pulmonary measurements of a user and requiring periodic sterilization including a conduit having an inlet port for receiving patient's exhaled air, and and outlet port, and defining a flow path therebetween, flow responsive means disposed in the flow path for reacting to flow volume of exhaled air through said conduit;

(b) a second unit not requiring periodic sterilization and including indicator means out of flow communication with said flow path and operationally connected to and readily disconnectable from said flow responsive means for providing a representation of air volume passing through said conduit, for separation of said unit from said first unit for sterilization of first unit; and (c) mutually cooperative connecting means matably provided on each said unit for ready release of said indicator means from said conduit for separation of said indicator therefrom, wherein said flow responsive means comprises a turbine; said turbine comprising a fixed stator and a rotor therein, rotational relative to a central axis of said stator; said fixed stator having opening means therein that comprises part of said flow path, wherein said rotor comprises an axial shaft in said stator mounted to said housing on jeweled bearings, and a plurality of radially extending vanes respectively thicker at said shaft and thinner at outmost portions thereof.

13. A spirometer as described in claim 12, wherein said rotor comprises two oppositely located ones of said vanes integrally formed from fiber re-enforced plastic resin bound to said shaft.

14. In a spirometer for measuring air volume having a conduit having an inlet port and an outlet port and defining a flow path therebetween, and flow responsive means disposed in the flow path for reacting to a flow volume of air through the conduit, the improvement which comprises:

a turbine constituting said flow responsive means, said turbine comprising a fixed stator and a rotor therein, rotational relative to a central axis of said stator, said fixed stator having opening means therein that comprise part of said flow path wherein said opening means in said stator comprise a plurality of openings disposed adjacent one another about the circumference of said stator, wherein said rotor includes generally radially extending vanes disposed for rotation within said stator about an axis thereof, and wherein said vanes and openings are formed, along the direction of said axis, such that a given rotor vane is at least some times spanning two or more adjacent ones of said openings.

15. In a spirometer having a conduit having an inlet port and an outlet port and defining a flow path therebetween, flow responsive means disposed in the flow path for reacting to a flow volume of air through the conduit, and indicator means operationally connected to and readily disconnectable from said flow responsive means for providing a representation of air volume passing through said conduit, the improvement which comprises:

a spirometer wherein that portion of said conduit that has a flow responsive means disposed therein comprises a first chamber, and wherein a second chamber vented to atmosphere is formed at the mounting of said indicator means to said conduit, said second chamber being penetrated in opposite directions by substantially colinear shafts respectively operatively associated with said flow responsive means and said indicator means, said shafts being bent to cross each other and thereby to form a relatively friction-free, lightweight low inertia universal joint between said flow responsive means and said indicator means which can be disassembled and reassembled without preorientation of the shaft.

16. A spirometer as described in claim 15, wherein said conduit and said indicator means each define an oppositely facing, mutually matable cylindrical protuberance surrounding and protecting the associated colinear shafts penetrating the second chamber between said housing and said indicator means.

17. A spirometer as described in claim 15, including calibration means for variably occluding said opening in said stator, wherein a second, vented chamber is formed at the mounting of said accumulator means to said housing means, said chamber being penetrated in opposite directions by substantially colinear shafts respectively operatively associated with said rotor and said accumulator, said shafts being bent to cross each other and thereby to form lighweight low inertia and a relatively friction free universal joint between said rotor and said accumulator which can be disassembled and reassembled without preorientation of the shafts.

18. A spirometer comprising:
(a) a first unit for use in obtaining pulmonary measurements of a user and requiring periodic sterilization including a conduit having an inlet port for receiving patient's exhaled air, and an outlet port, and defining a flow path therebetween, flow responsive means disposed in the flow path for reacting to flow volume of exhaled air through the conduit;
(b) a second unit not requiring periodic sterilization and including indicator means out of flow communication with said flow path, and operationally connected to and readily disconnectable from said flow responsive means for providing a representation of air volume passing through said conduit, for separation of said unit from said first unit for sterilization of first unit; and
(c) mutually cooperative connecting means matably provided on each said unit for ready release of said indicator means from said conduit for separation of said indicator therefrom, wherein that portion of said conduit that has a flow responsive means disposed therein comprises a first chamber, and wherein a second chamber vented to atmosphere is formed at the mounting of said indicator means to said conduit, said second chamber being penetrated in opposite directions by substantially colinear shafts respectively operatively associated with said flow responsive means and said indicator means, wherein said shaft that is associated with said flow responsive means is a direct axial extension of a rotor of said flow responsive means, with a shaft opening between said first and second chambers including jeweled bearings for said direct axially extended shaft, including sealing means sealing said shaft opening and said shaft, said sealing means including the close clearance of the bearings relative to the shaft and water present from condensation or humidity.

19. A spirometer as described in claim 18, wherein said second chamber includes means for venting and draining in order to prevent moisture from reaching said indicator means.

20. A spirometer comprising:
(a) a first unit for use in obtaining pulmonary measurements of a user and requiring periodic sterilization including a conduit having an inlet port for receiving patient's exhaled air, and an outlet port, and defining a flow path therebetween, flow responsive turbine means disposed in the flow path for reacting to flow volume of exhaled air through the conduit;
(b) a second unit not requiring periodic sterilization and including indicator means out of flow communication with said flow path, connected to and readily disconnectable from said flow responsive turbine means for providing a representation of air volume passing through said conduit, for separation of said unit from said first unit for sterilization of first unit, including means isolating said indicator means from said air flow path;
(c) mutually cooperative connecting means matably provided on each said unit for ready release of said indicator means from said conduit for separation of said indicator therefrom; and
(d) mechanical motion transmission means in operative direct mechanical interconnecting relation between said indicator means and said turbine means, from a location within said flow path to a location out of communication with said flow path, including means isolating said indicator means from said air flow path, wherein said isolating means includes jeweled bearing means.

21. A spirometer comprising:
(a) a first unit for use in obtaining pulmonary measurements of a user and requiring periodic sterilization including a conduit having an inlet port for receiving patient's exhaled air, and an outlet port, and defining a flow path therebetween, flow responsive means disposed in the flow path for reacting to flow volume of exhaled air through the conduit;
(b) a second unit not requiring periodic sterilization and including indicator means out of flow communication with said flow path, and operationally connected to and readily disconnectable from said flow responsive means for providing a representation of air volume passing through said conduit, for separation of said unit from said first unit for sterilization of first unit; and (c) mutually cooperative connecting means matably provided on each said unit for ready release of said indicator means for said conduit for separation of said indicator therefrom, wherein said flow responsive means comprises a turbine said turbine comprising a fixed stator and a rotor therein, rotational relative to a central axis of said stator, said fixed stator having opening means therein that comprise part of said flow path, including means isolating said indicator means from said air flow path, and including calibration means for variably occluding said opening means in said stator.

* * * * *